United States Patent [19]

Liao

[11] Patent Number: 5,442,973
[45] Date of Patent: Aug. 22, 1995

[54] LOCKING MECHANISM BETWEEN STEM MEMBER AND FORK TUBE OF A BICYCLE

[75] Inventor: Jim Liao, Taipei Hsien, Taiwan

[73] Assignee: Hsin Lung Accessories Co., Ltd., Taiwan

[21] Appl. No.: 180,038

[22] Filed: Jan. 11, 1994

[51] Int. Cl.⁶ .................... B62K 19/18; B62K 21/02
[52] U.S. Cl. ...................... 74/551.1; 280/279; 280/280; 280/281.1; 403/370
[58] Field of Search .............. 74/551.1; 280/279, 280, 280/281.1; 403/368, 369, 370

[56] References Cited

U.S. PATENT DOCUMENTS 4,167,352  9/1979  Pletscher .................. 403/369 X
5,263,802  11/1993  Fichot et al. ............... 403/370 X

FOREIGN PATENT DOCUMENTS 1175785  8/1985  U.S.S.R. ...................... 74/551.1

Primary Examiner—Charles A. Marmor
Assistant Examiner—Mary Ann Battista
Attorney, Agent, or Firm—Andrus, Sceales, Starke & Sawall

[57] ABSTRACT

A locking mechanism comprises a bicycle fork tube which is rotatably received in a bicycle head tube. This fork tube has a plurality of elongate slots at its tubular wall below the top end portion. A stem member has a collar thereof which is removably enveloped around the top end portion of the bicycle fork tube. A tubular housing containing an actuating block and wedge members is removably received by the fork tube for retaining the stem member to the fork tube thereof.

6 Claims, 4 Drawing Sheets

LOCKING MECHANISM BETWEEN STEM MEMBER AND FORK TUBE OF A BICYCLE

BACKGROUND OF THE INVENTION

This invention relates to a locking mechanism and, more particularly, to a locking mechanism for locking a stem member to a fork tube of a bicycle.

Referring to FIG. 1, a sketched view of the connection between a stem member 1 and a fork tube 2 is shown. The stem member 1 is provided with a coupler 3 which is substantially a C-shape clip. This coupler 3 is fastened to the fork tube 2 by locking a bolt member 4 inserted to a predetermined torque. However, when the bolt 4 is locked to the predetermined torque, the bolt head is nakedly exposed. It will become a potentially dangerous spot since the knee of the rider may be injured by accidental contact with the bolt head. Moreover, this naked bolt head brings a negative effect to the aesthetic appearance of the bicycle as a whole.

SUMMARY OF THE INVENTION

It is the object of this invention to provide a locking mechanism which facilitates an excellent engagement between the stem member and the fork tube while providing an aesthetic appearance as well.

In order to achieve the object set forth above, a locking mechanism made according to this invention comprises a fork tube which is rotatably received in the head tube. This fork tube has a plurality of elongate slots at the tubular wall below the top end portion thereof. A stem member has a collar thereof which removably envelops to the upper portion of the fork tube. A locking mechanism is removably received by the fork tube. This locking mechanism includes a tubular housing which defines a bottom at the lower end and an opening at the top end thereof. This tubular housing is provided with a plurality of elongate slots which are in line with the elongate slots of the fork tube at the tubular wall thereof. A plurality of wedge members are slidably disposed within said elongate slots of the tubular wall. An actuating block is disposed between the wedge members. This actuating block is provided with a threaded hole at the center portion thereof. A lid member is removably mounted at the opening of the tubular housing. This lid member has an opening at center thereof and is interconnected with the actuating block by means of a bolt member such that when the actuating block is moved upward by the rotation of the bolt member interconnected between the lid member and the actuating block, the wedge members are driven outward through the elongate slots of the tubular housing and the fork member and are pressed against the inner wall of the collar.

BRIEF DESCRIPTION OF THE DRAWINGS

The structural and operational characteristics of the present invention and its advantages as compared to the known state of the prior art will be better understood from the following description, in conjunction with the attached drawings which show illustratively but not restrictively an example of a locking mechanism for a stem member and a fork tube, In the drawings.

DETAILED DESCRIPTION OF THE PREFERABLE EMBODIMENTS

Figure 1:
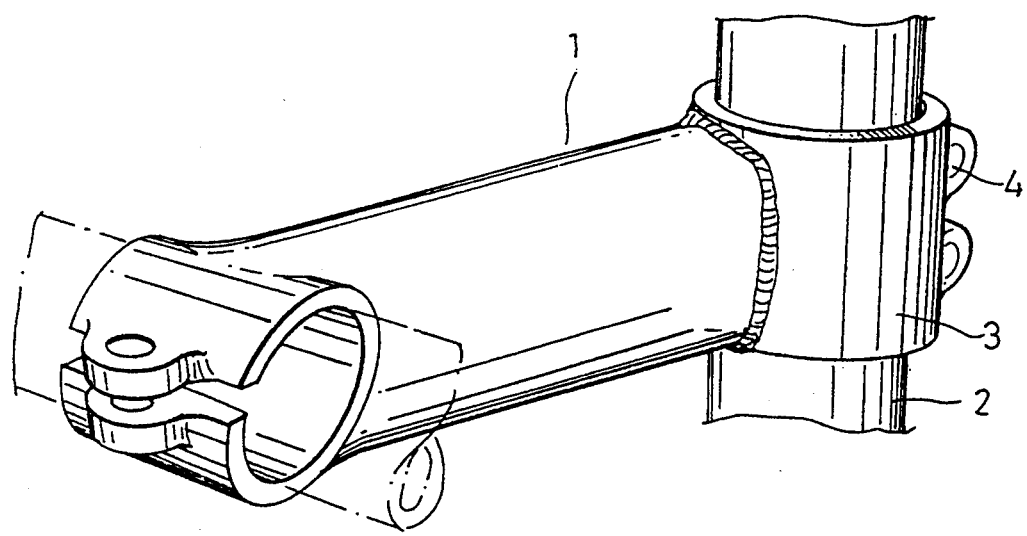
FIG. 1 is a sketched view of a conventional stem member and fork tube.
Figure 2:
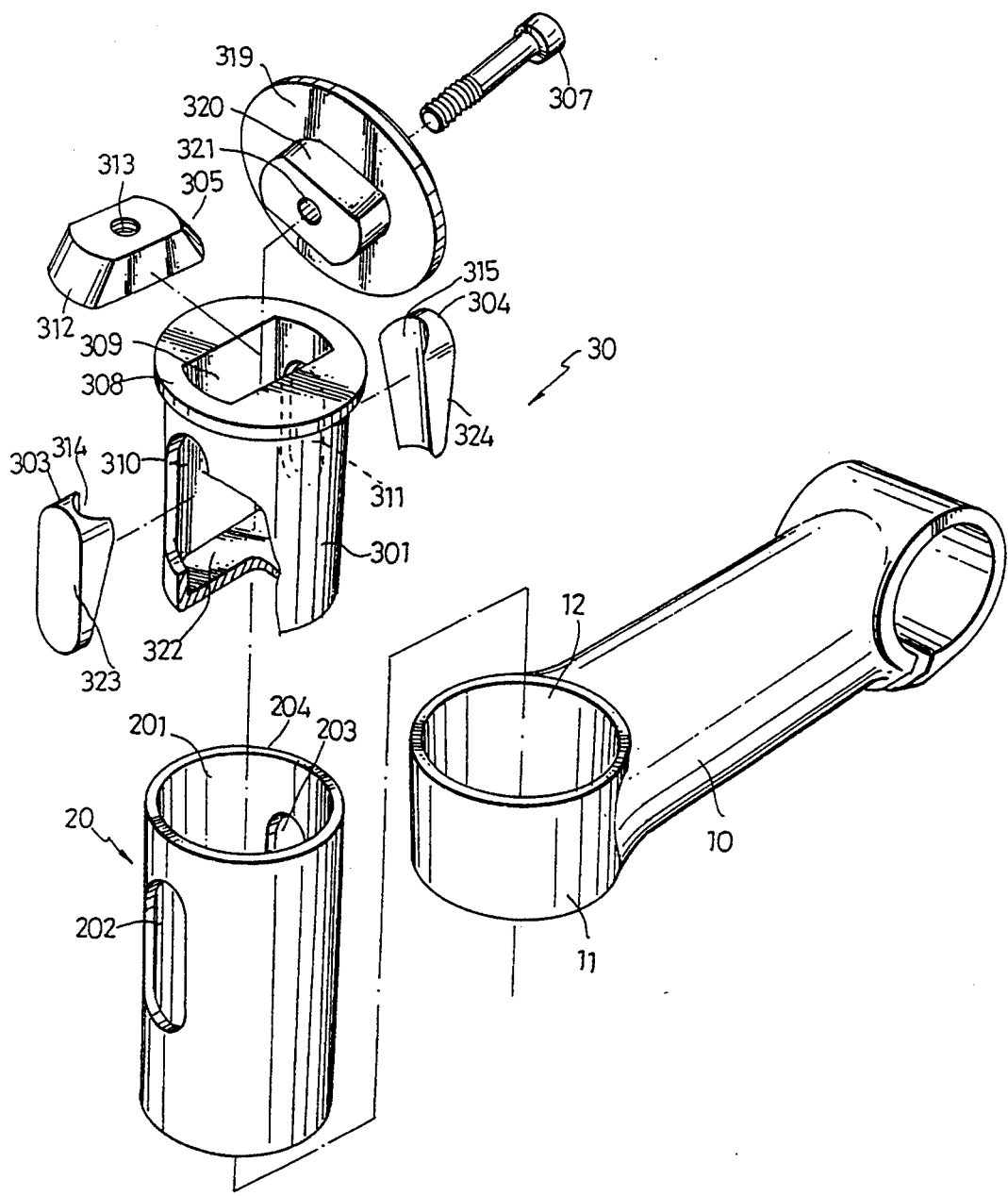
FIG. 2 is an exploded perspective view of a stem member and a fork tube incorporated with a locking mechanism according to the present invention.
Figure 3:
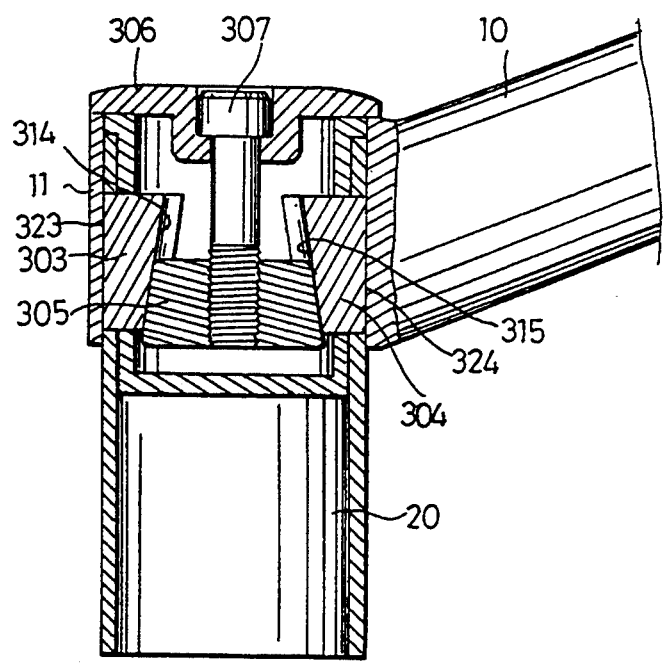
FIG. 3 is a cross sectional view of an assembled stem member and fork tube incorporated with a locking mechanism according to the present invention.

Referring to FIGS. 2 and 3, a stem member 10 is provided with a collar 11 at one end, A channel 12 is defined at the center of the collar 11, A fork tube 20 defines a passage 201 at the hollow center portion thereof, This fork tube 20 further has a pair of elongate slots 202, 203 at the wall portion thereof.

A locking mechanism 30 is removably inserted into the passage 201 of the fork tube 20. This locking mechanism 30 includes a tubular housing 301 which defines a tubular wall, a chamber 309 having a circular cross section and which has a bottom 322 at the lower end and flange 308 at the top end thereof. This tubular housing 301 is provided with two elongate slots 310, 311 with respective to the elongate slots 202, 203 of the fork tube 20 at the tubular wall thereof. Two wedge members 303, 304 are slidably disposed within said elongate slots 310, 311 of the tubular wall. These two wedge member 303, 304 have a projected circular outer walls 323, 324 and an inclined recessed circular surface 314, 315 at the inner wall. A space is defined jointly by those two wedge members 303, 304. An actuating block 305 is disposed between the wedge members 303, 304. This actuating block 305 is placed onto the bottom 322 of the chamber 309. This actuating block 305 has a circular head 312 with circular surface which will form a tight contact with the recessed circular surfaces 314, 315 of the wedge members 303, 304. A lid member 319 is removably mounted at the flange 308 of the tubular housing 301. This lid member 319 has an opening 321 at its center thereof. This lid member 319 further includes a projecting portion 320, which is removably inserted into the chamber 309 of the tubular housing 301. The actuating block 305 is provided with threaded hole 313 at the center portion thereof. The lid member 319 is interconnected with the actuating block 305 by means of a bolt member 307 which is first passed through the opening 321 of the lid member 319 and then retained by the threaded hole 313 of the actuating block 305.

In assembling, the tubular housing 301 is inserted into the passage 201 of the fork tube 20 such that the flange 308 of the tubular housing 301 is pressed against the upper portion 204 of the fork tube 20. Meanwhile, the elongate slots 310, 311 of the tubular housing 301 are in line with the elongate slots 202, 203. The outer wall of the fork tube. 20 is enveloped by the collar 11 of the stem member 10. The actuating block 305 is first placed into the chamber 309 and disposed on the bottom 322 of the chamber 309. The wedge members 303, 304 are then positioned and received by the elongate slots 310, 311, and 202, 203 respectively. The lid member 319 with its projecting portion 320 received by the chamber 309 is then positioned at the upper portion of the flange 308 of the tubular housing 301. Finally, a bolt member 307 is inserted into the opening 321 of the lid member 309 and then retained by the threaded hole 313 of the actuating block 305. When the actuating block 305 is moved upward by the rotation of the bolt member 307, the wedge members 303, 304 are driven outward through the elongate slots 310, 311 of the tubular housing 301 ant then will project out of the elongate slots 202, 203 of the fork tube 20 and will be pressed against the inner wall of the collar 11 and retain the collar 11 thereof.

Figure 4:
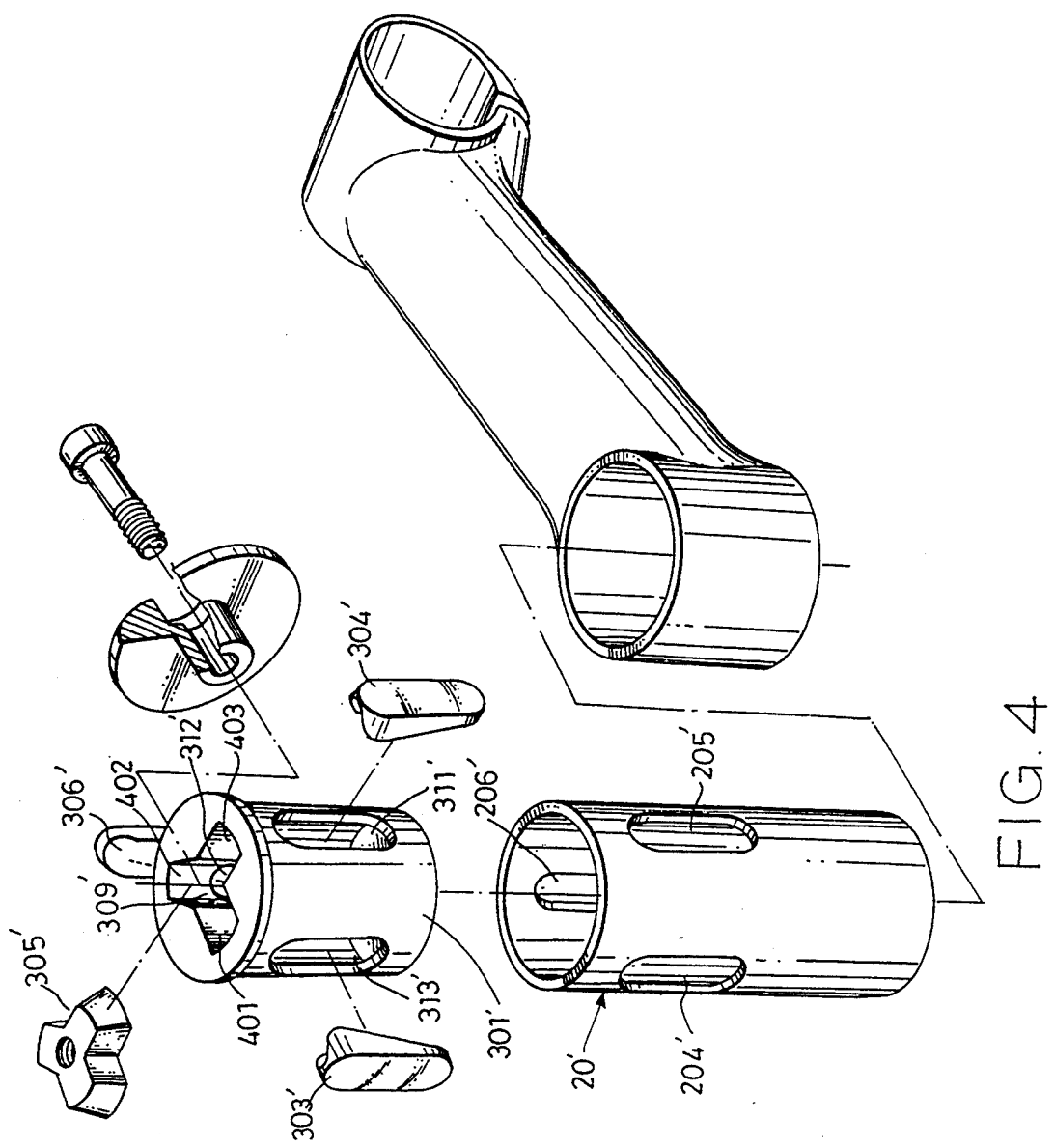
FIG. 4 is a second embodiment of the locking mechanism made according to the present invention.

Referring to FIG. 4, another embodiment of the locking mechanism 30 made according to this invention is shown. In this embodiment, three elongate slots 204', 205', 206', 311', 312' and 313' are provided on the fork tube. 20' and the tubular housing 301' respectively. This tubular housing 301' has a chamber 309' with three individual slots 401 401, 402, and 403. An actuating block 305' which has the same configuration as that of the chamber 309' is disposed at the bottom of the passage 309'. Meanwhile, three wedge members 303', 304' and 306' are disposed and each of these wedge members 303', 304' and 306' are received respectively by the three individual slots 401, 402, and 403. The actuation of this locking member 30' is as described in the foregoing.

Although the present invention has been described in connection with the preferred embodiments thereof, many other variations and modifications will now become apparent to those skilled in the art without departing from the scope of the invention. It is preferred, therefore, that the present invention not be limited by the specific disclosure herein, but only by the appended claims.

I claim:
1. A locking mechanism comprising
a bicycle fork tube being rotatably received in a bicycle head tube, said bicycle fork tube being defined as having a passage in its center portion, said bicycle fork tube having a plurality of elongate slots in its tubular wall below its top end portion thereof;
a stem member having a collar which removably envelops the top end portion of said bicycle fork tube, said collar further being defined by a channel in its center; and
a locking mechanism being removably received by said passage of said bicycle fork tube, said locking mechanism including
a tubular housing defining a tubular wall having a bottom at its lower end and a flange at its top end, a chamber being enclosed between said tubular wall of said tubular housing and said bottom, said tubular housing being provided with a plurality of elongate slots with respect to said elongate slots of said bicycle fork tube;
a plurality of wedge members being slidably disposed within said elongate slots of said tubular housing,
an actuating block being disposed at the bottom of said chamber of said tubular housing and between said wedge members, said actuating block being provided with a threaded opening at its center portion; and
a lid member being removably mounted at the flange of the tubular housing, said lid member having an opening at its center thereof, said lid member being interconnected with said actuating block by means of a bolt member such that when said actuating block is moved upward by the rotation of said bolt member, said wedge members are driven outward through said elongate slots of said tubular housing and said bicycle fork tube and are pressed against the inner wall of said collar.

2. A locking mechanism as recited in claim 1, wherein said flange is provided at the top end of said tubular housing to sustain said lid member.

3. A locking mechanism as recited in claim 1, wherein said tubular housing has a passage with a circular cross section at its center.

4. A locking mechanism as recited in claim 1, wherein the number of said wedge members is at least two.

5. A locking mechanism as recited in claim 1, wherein said wedge members have an inclined circular recessed surface at the inner side thereof.

6. A locking mechanism as recited in claim 5, wherein said actuating block has a circular portion at both ends which are received by said inclined circular recessed surface of said wedge members, respectively.

* * * * *